Patented Apr. 30, 1935

1,999,538

UNITED STATES PATENT OFFICE 1,999,538

PROCESS FOR THE CONDENSATION OF ORGANIC ACIDS AND THEIR ANHYDRIDES ACCORDING TO THE FRIEDEL AND CRAFTS REACTION

Philip H. Groggins and Ray H. Nagel, Washington, D. C., assignors to Henry A. Wallace as Secretary of Agriculture of the United States of America No Drawing. Application August 31, 1933,
Serial No. 687,640

4 Claims. (Cl. 260—64)

(Granted under the act of March 3, 1883, as amended April 30, 1928; 370 O. G. 757)

The invention covered by this application may be manufactured and used by or for the Government, for governmental purposes, without payment to us of any royalty thereon.

This invention relates to improvements in the method of preparing organic compounds according to the Friedel and Crafts reaction. More particularly it relates to the condensation of organic acids and their anhydrides with suitable aromatic compounds by this procedure.

A further object of our invention is the preparation of ketones, carboxylic acids, keto acids and other compounds which are made available by the condensation of acids and acid anhydrides with aromatic compounds according to the Friedel and Crafts reaction.

Heretofore acid anhydrides have been condensed with aromatic compounds in the presence of a halide of aluminum, iron, zinc, or titanium to yield ketones, keto acids, carboxylic acids and aldehydes. The synthesis of ketones and keto acids may be exemplified by the following reactions which illustrate the preparation of acetophenone and 2-benzoylbenzoic acid respectively:

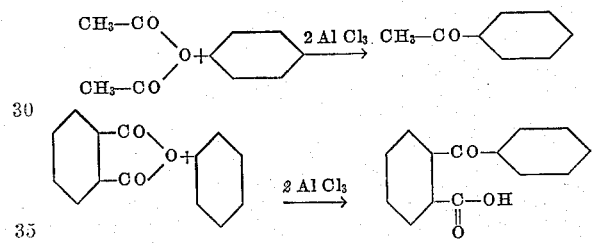

We have made the discovery that the addition of halogen carriers such as metallic iron, aluminum, and zinc appreciably promotes the condensation of such acid anhydrides according to the Friedel and Crafts reaction, enabling us to get higher yields of a purer product.

We have furthermore found that such halogen carriers also promote the reaction when the simple organic acids are used instead of their anhydrides in accordance with our copending application for patent.

On the other hand, we have found that the introduction of an easily dissociated halogen compound such as thionyl chloride or potassium chlorate, effects adversely the condensation of acids and acid anhydrides, altho they appear to exert a beneficial effect in the condensation of acid chlorides with certain aromatic compounds.

The advantages to be gained by using such halogen carriers, such as iron, aluminum, zinc, phosphorous and carbon in the condensation of organic acids and acid anhydrides with aromatic compounds may be appreciated readily by referring to the following data obtained from our tests:

EXAMPLE I.—PREPARATION OF ACETOPHENONE

Acetic anhydride + benzene + aluminum chloride

| Substance added— | Per cent yield |
|---|---|
| Control (none) | 87.5 |
| 10 grams iron | 98.3 |
| 5 grams aluminum | 97.9 |

EXAMPLE II.—PREPARATION OF P-METHYLACETOPHENONE

Acetic acid + toluene + aluminum chloride

| Substance added— | Per cent yield |
|---|---|
| Control (none) | 61.2 |
| 5 grams iron | 66.7 |
| 2 grams aluminum | 78.7 |

We have ascertained that in the synthesis of keto acids, uniformly excellent results are obtained when such halogen carriers are introduced with the reactants. This discovery is most surprising in view of the widespread belief that the presence of iron compounds in the usual condensing agent, viz: aluminum chloride, is deleterious.

The added metal or halogen carrier is easily removed from the other components of the reaction mass during the usual operating steps. In the synthesis of aralkyl ketones it remains behind with the non-volatile constituents, and in the preparation of keto acids, it is left on the filter when the soluble alkali salts of the keto acids are filtered.

In carrying out our invention no unusual steps or precautions are therefore necessary. The halogen carrier is merely added to the reaction mass comprising an aromatic compound, a Friedel and Crafts catalyst, and either an organic acid, or its anhydride. Thus, in the production of acetophenone either acetic acid or acetic anhydride may advantageously be condensed with benzene in the presence of a halogen carrier, in accordance with our invention.

In our specification and claims the term "halogen carrier" refers to the metals iron, aluminum, and zinc, which metals are employed as catalysts in halogenations.

In carrying out our invention we prefer to use powdered aluminum metal, and finely divided reduced iron. In general, we find it advantageous to employ the halogen carrier in a finely subdivided state and it may be added at any time or in any sequence along with the other reactants. One or more of the halogen carriers may also be employed simultaneously.

Having thus described our invention, we claim:

1. In the condensation of organic acids and their anhydrides with aromatic compounds according to the Friedel and Crafts reaction, the improvement which comprises the inclusion of finely divided halogen carrier with the reaction components.

2. In the condensation of organic acids or their anhydrides with aromatic compounds according to the Friedel and Crafts reaction, the improvement which comprises the inclusion of finely divided metallic iron to the reactants.

3. In the condensation of organic acids or their anhydrides with aromatic compounds according to the Friedel and Crafts reaction, the improvement which comprises the addition of metallic aluminum to the reactants.

4. In the condensation of organic acids or their anhydrides with aromatic compounds according to the Friedel and Crafts reaction, the improvement which comprises the addition of finely divided metallic zinc to the reactants.

PHILIP H. GROGGINS.
RAY H. NAGEL.